(12) United States Patent
Vollath et al.

(10) Patent No.: US 6,358,562 B1
(45) Date of Patent: Mar. 19, 2002

(54) METHOD FOR THE PRODUCTION OF COATED PARTICLES

(75) Inventors: Dieter Vollath, Stutensee; Vinga Szabo, Bruchsal; Bernd Seith, Karlsruhe, all of (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 09/647,809

(22) PCT Filed: Mar. 25, 1999

(86) PCT No.: PCT/EP99/02028

§ 371 Date: Oct. 5, 2000

§ 102(e) Date: Oct. 5, 2000

(87) PCT Pub. No.: WO99/52624

PCT Pub. Date: Oct. 21, 1999

(30) Foreign Application Priority Data

Apr. 8, 1998 (DE) .......................................... 198 15 698

(51) Int. Cl.[7] .............................................. B05D 3/06
(52) U.S. Cl. ...................... 427/228; 427/215; 427/216; 427/221; 427/575; 427/577
(58) Field of Search ................................ 427/212, 215, 427/216, 220, 221, 228, 488, 562, 575, 577

(56) References Cited

U.S. PATENT DOCUMENTS 4,645,713 A * 2/1987 Shioya et al. ................ 428/457
5,665,277 A * 9/1997 Johnson et al. ................. 264/6
5,783,263 A * 7/1998 Majetich et al. ............ 427/580
5,889,081 A * 3/1999 Kakegawa et al. ......... 523/156
6,258,237 B1 * 7/2001 Gal-Or et al. .............. 204/548

FOREIGN PATENT DOCUMENTS

| FR | 2 336 456 | 7/1977 |
| FR | 2 353 621 | 12/1977 |
| FR | 2 353 622 | 12/1977 |

* cited by examiner

*Primary Examiner*—Shrive P. Beck
*Assistant Examiner*—Jennifer Calcagni
(74) *Attorney, Agent, or Firm*—Venable; Robert Kinberg; Ashley J. Wells

(57) ABSTRACT

A method for producing coated particles includes the steps of converting particles consisting of a compound of one of (a) a metal with a non-metal or (b) a semi-metal with a non-metal to an aerosol form; contacting the particles in aerosol form with a gas including at least one aromatic compound; and guiding the particles in aerosol form together with the gas through a plasma zone of a microwave plasma. The at least one aromatic compound is preferably selected from the group consisting of benzol, benzol derivatives, naphthalene, and naphthalene derivatives. The gas preferable further includes at least one metallocene which is preferably selected from the group consisting of ferrocene or magnesocene.

7 Claims, 1 Drawing Sheet

METHOD FOR THE PRODUCTION OF COATED PARTICLES

BACKGROUND OF THE INVENTION

1. Field of the Invention

The invention relates to a method for producing coated particles according to claim 1.

2. Description of the Related Art

Coated particles are known from German Patent Application Published for Opposition 2 011 306. These particles can among other things consist of a core composed of an inorganic compound of a metal or semimetal, e.g. metal oxides or semimetal oxides such as $Al_2O_3$, $Zr_2O_3$ or $SiO_2$, and a shell. A polymerized organic compound such as a polyvinyl or polystyrene is suggested for the shell.

Similar particles are known from British Patent 1,006, 753. The aforementioned particles also comprise a core, composed of a metal compound and a shell of poly (p-xylene), produced through a partial pyrolysis of cyclical di-p-xylene.

German Patent 94 03 581 U describes coated nano-powder, consisting of a core with a diameter of 3 to 50 nm of a compound containing a metal and a non-metal, as well as a shell consisting of a compound of a different metal with a non-metal. A device for producing the nano-powder, which utilizes a microwave plasma, is described in detail.

The French references FR-A-2 353 621 and FR-A-2 353 622 disclose particles that are preferably made of substances containing silicon oxide and coated with a carbon-containing coating. The coating is produced through catalytic cracking, e.g. of propylene, at temperatures between 250° and 1000° C. The coated particles serve as filler materials for rubber.

French reference FR-A-2 336 456 discloses coated pigment particles. Glass, talcum, silica gel or aluminum oxide or $TiO_2$-coated mica flakes are mentioned among other things as substrate. The shell consists of soot, which is precipitated out together with metal hydroxides, metal oxides or bismuth oxychloride.

German Patent 196 38 601 C1 discloses a method for producing particles with a core combining a metal with a non-metal and a shell, composed of a polymerized organic compound. With this method, metal compounds that can be evaporated and a reaction gas are made to react in a microwave plasma, wherein the core is produced. The UV light of the microwave plasma polymerizes the shell onto the core. These particles are nano particles with a core diameter of 3 to 100 nm and a shell thickness of 1 to 20 nm.

Under the keyword "Aerosil®," the Römpp Chemical Dictionary describes amorphous, spherical particles of "pyrogenic" silicic acid with a diameter of 10 to 20 nm, which serve as filler materials for rubber.

Under the keyword "soot," the Römpp Chemical Dictionary furthermore provides the information that tire manufacturers in particular utilization soot as filler material for elastomer. Soot is produced through an incomplete combustion of, for example, aromatic hydrocarbons with a sooty flame that burns in an oxygen-poor atmosphere.

It is the object of the invention to suggest a method for producing particles that can chemically bind just as easily as soot with polymeric phases, particularly rubber, and show improved abrasion behavior. The particles should be distributed homogeneously in the polymeric phase and, as a result of the chemical binding, should not separate out again during the deformation of rubber. The method is designed in particular to permit the production of nano particles.

SUMMARY OF THE INVENTION

This object is solved with the method described in claim 1. The additional claims contain preferred embodiments of the method.

The abrasion behavior can be improved considerably through the binding of hard particles with polymeric phases, particularly rubber. The abrasion behavior plays an important role, especially for vehicle tires.

Inorganic particles, particularly ceramic particles, cannot be distributed homogeneously in polymeric phases without being subjected to a pretreatment because they do not chemically bind with the polymeric phase.

According to the invention, coated particles are produced, which consist of a core combining a metal or semimetal with a non-metal, which core is surrounded by a shell made of soot. Owing to the soot shell, the coated particles can bind in the same way as soot with polymeric phases, particularly rubber for motor vehicle tires. As compared to soot alone, however, the particles have the advantage that the abrasion resistance of the polymeric phase is increased owing to its hard core.

The core of the coated particles preferably consists of a ceramic. Preferred is a core of silicon dioxide. However, the core can also consist of other hard materials, e.g. silicon nitride, aluminum oxide or zircon dioxide. Particularly preferred are coated nano particles with a core size of less than 100 nm, especially approximately 3 to 50 nm. Especially favorable qualities are expected when using such nano particles. The selection of the soot shell thickness is virtually optional. In practical operations, it results from the production method used.

Suitable as production method in particular for nano particles is the conversion in a microwave plasma. For this, particles consisting of a compound of a metal or semimetal with a non-metal are converted in a first processing step to an aerosol form. This processing step is preferably carried out with the method described in German Patents 196 38 601 C1 and 94 03 581 U. These two documents provide a detail description of a suitable device and a suitable method for producing cores of coated nano particles, wherein the produced cores are simultaneously put into aerosol form. For the processing of larger cores, however, the production methods specified in the remaining cited references are suitable as well.

The particles are subsequently brought into contact with a gas containing at least one aromatic compound. In particular benzol and benzol derivatives such a toluene, xylene or creosol are suitable as aromatic compounds because of their high vapor pressure. However, multi-core aromatic substances such as naphthalene and its derivatives can also be used. The share of aromatic compounds in the gas should be approximately 5 to 10 volume percent.

The particles present in aerosol form are subsequently guided together with the gas through the plasma zone of a microwave plasma, wherein the particles are provided with a soot shell. Experiments have shown that the soot shell produced in this way still contains residual bonds to hydrogen ions, which in particular make it easier to bind with rubber.

If a metallocene is additionally added to the gas, the yield relative to the carbon share can be increased noticeably. In particular ferrocene [$Fe(C_5H_5)_2$] or magnesocene [$Mg(C_5H_5)_2$] are suitable as metallocenes. The metallocene share in the organic phase preferably amounts to 10 to 20 weight percent.

The coated particles obtained with the production method, described herein, are suitable in particular as additive for polymeric phases, above all rubber, and as additive for the production of motor vehicle tires. A considerable improvement in the abrasion behavior can be expected.

BRIEF DESCRIPTION OF THE DRAWINGS

The invention is explained in further detail in the following with the aid of Figures and exemplary embodiments: Shown are in:

FIG. 1 shows a schematic representation of the device utilized herein, comprising a magnetron 1, three circulators 2, a 3 db junction 3, two directional couplers 4 in each junction and respectively one tri-stub-tuner 5. The waveguides 6 of each junction discharge into two $TE_{11}$ cavity resonators, which surround a reaction pipe 8.

FIG. 2 shows the reaction pipe 8 with the two $TE_{11}$ cavity resonators 7. The reaction pipe has a gas intake 9 for the reaction gas that is used to produce the cores of the coated particles. Another gas intake 10 serves to feed in a chemical compound that reacts with the reaction gas to form the desired core. The reaction gas and the chemical compound pass through a first plasma zone, in which the core is formed. An additional gas intake 13 is provided following the first plasma zone, which serves to feed in the gases containing aromatic compounds. Following this, the cores and the gas pass through another plasma zone 12, in which the cores are provided with the soot shell. The product is then collected in a product collector (not shown here).

DESCRIPTION OF THE PREFERRED EMBODIMENTS

Example 1

Figure 1:
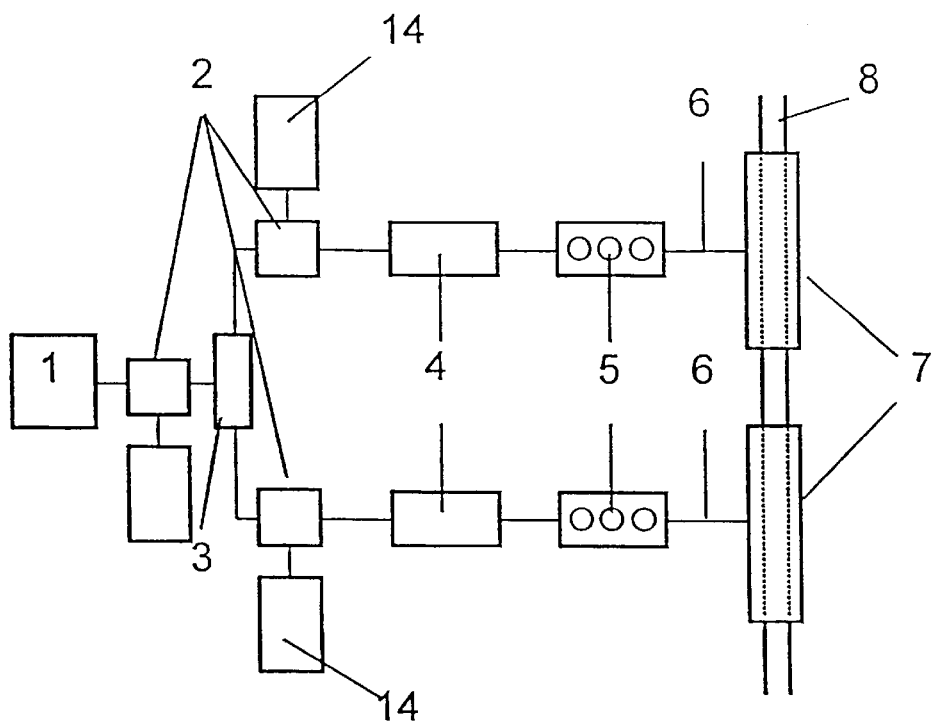
FIG. 1 A schematic representation of the device used for carrying out the exemplary embodiments.
Figure 2:
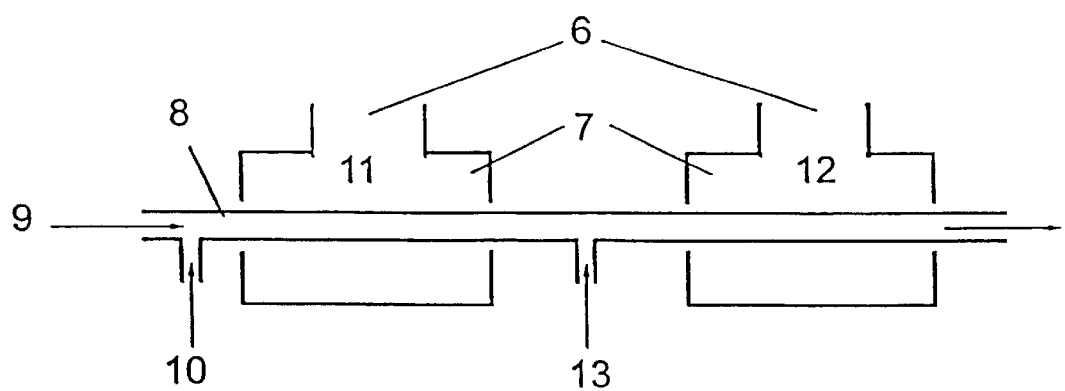
FIG. 2 The reaction pipe for the device.

Silicon chloride $SiCl_4$ was fed into the gas intake 10 (FIG. 2) as chemical compound for producing the core. The silicon oxide was converted in the plasma zone 11 to silicon dioxide particles with the aid of a reaction gas, composed of argon and 20% oxygen, which gas was fed in through the gas intake 9. In the plasma zone 12, the silicon dioxide particles were coated with carbon with the aid of gaseous naphthalene with 10 weight percent ferrocene, fed in through the gas intake 13. The pressure inside the reaction pipe was approximately 15 mbar, the gas flow was 20 Nl/minute, the temperature in the plasma zone was 550° C. and the microwave frequency was 915 Mhz. The $TE_{01}$ mode was used as oscillation mode in the microwave resonator. The experiment resulted in nano particles of a glass-type $SiO_2$ with an amorphous carbon coating.

Example 2

The experiment according to example 2[sic] was repeated. However, benzol with approximately 10 weight percent magnesocene was used as coating gas. The system pressure amounted to approximately 20 mbar, the gas flow in the reaction pipe was 50 Nl/minute. The temperature in the two plasma zones was increased to approximately 700° C. The experiment resulted in glass-type silicon dioxide particles with a coating of amorphous carbon, containing a small share of crystallized graphite.

What is claimed is:

1. A method for producing coated particles, comprising the steps of:
   a) converting particles consisting of a compound of one of (a) a metal with a non-metal or (b) a semi-metal with a non-metal to an aerosol form;
   b) contacting the particles in aerosol form with a gas comprising at least one aromatic compound; and
   c) guiding the particles in aerosol form together with the gas through a plasma zone of a microwave plasma to convert the at least one aromatic compound to soot and provide a coating of the soot thereof on the particles.

2. The method according to claim 1, wherein the at least one aromatic compound is selected from the group consisting of benzol, benzol derivatives, naphthalene, and naphthalene derivatives.

3. The method according to claims 2, wherein the gas further comprises at least one metallocene.

4. The method according to claim 3, wherein the at least one metallocene is selected from the group consisting of ferrocene or magnesocene.

5. A method for producing coated particles, comprising the steps of:
   a) converting particles consisting of a compound of one of (a) a metal with a non-metal or (b) a semi-metal with a non-metal to an aerosol form;
   b) contacting the particles in aerosol form with a gas comprising at least one aromatic compound and at least one metallocene; and
   c) guiding the particles in aerosol form together with the gas through a plasma zone of a microwave plasma.

6. The method according to claim 5, wherein the at least one metallocene is selected from the group consisting of ferrocene or magnesocene.

7. The method according to claim 5, wherein the at least one aromatic compound is selected from the group consisting of benzol, benzol derivatives, naphthalene, and naphthalene derivatives.

* * * * *